United States Patent [19]

MacMillan

[11] 4,212,604

[45] Jul. 15, 1980

[54] RIMLESS, PRODUCTION MOLD

[76] Inventor: Kenneth T. MacMillan, 347 Hazel St., P.O. Box 557, Macon, Ga. 31202

[21] Appl. No.: 2,064

[22] Filed: Jan. 9, 1979

[51] Int. Cl.² .............................................. B29H 5/04
[52] U.S. Cl. ...................................... 425/19; 425/24; 425/25
[58] Field of Search ....................... 425/17, 19, 20, 21, 425/22, 23, 24, 25, 40, 41, 394, 398

[56] References Cited

U.S. PATENT DOCUMENTS

| | | | |
|---|---|---|---|
| 2,377,351 | 6/1945 | Martin | 425/394 |
| 2,509,830 | 5/1950 | MacMillan | 425/40 X |
| 2,812,547 | 11/1957 | Duerksen et al. | 425/23 |
| 3,184,794 | 5/1965 | Sherkin | 425/19 |
| 3,315,312 | 4/1967 | Larson | 425/19 |
| 3,324,511 | 6/1967 | Micai et al. | 425/398 |
| 3,465,385 | 9/1969 | Zangl | 425/23 X |
| 4,022,554 | 5/1977 | MacMillan | 425/23 |
| 4,076,473 | 2/1978 | MacMillan | 425/24 X |

Primary Examiner—J. Howard Flint, Jr.
Attorney, Agent, or Firm—Diller, Ramik & Wight

[57] ABSTRACT

This disclosure relates to a retreading mold which includes first and second relatively movable platens carrying respective first and second bead aligner wheels and shafts with the shafts having opposing end portions threaded into a threaded coupling member which is in turn surrounded by a sleeve having axially opposite end portions slidably received in axial openings of the bead aligner wheels, the sleeve being normally biased axially away from one of the bead aligner wheels toward the other of the bead aligner wheels to form a sealed chamber defined by matrices carried by the platens in different closed positions of the platens, and an adjusting mechanism utilized when the matrices are open to drivably connect one of the shafts to the threaded connecting member to axially adjust the latter for locking the platens in any one of a variety of different distances in closed positions thereof.

20 Claims, 4 Drawing Figures

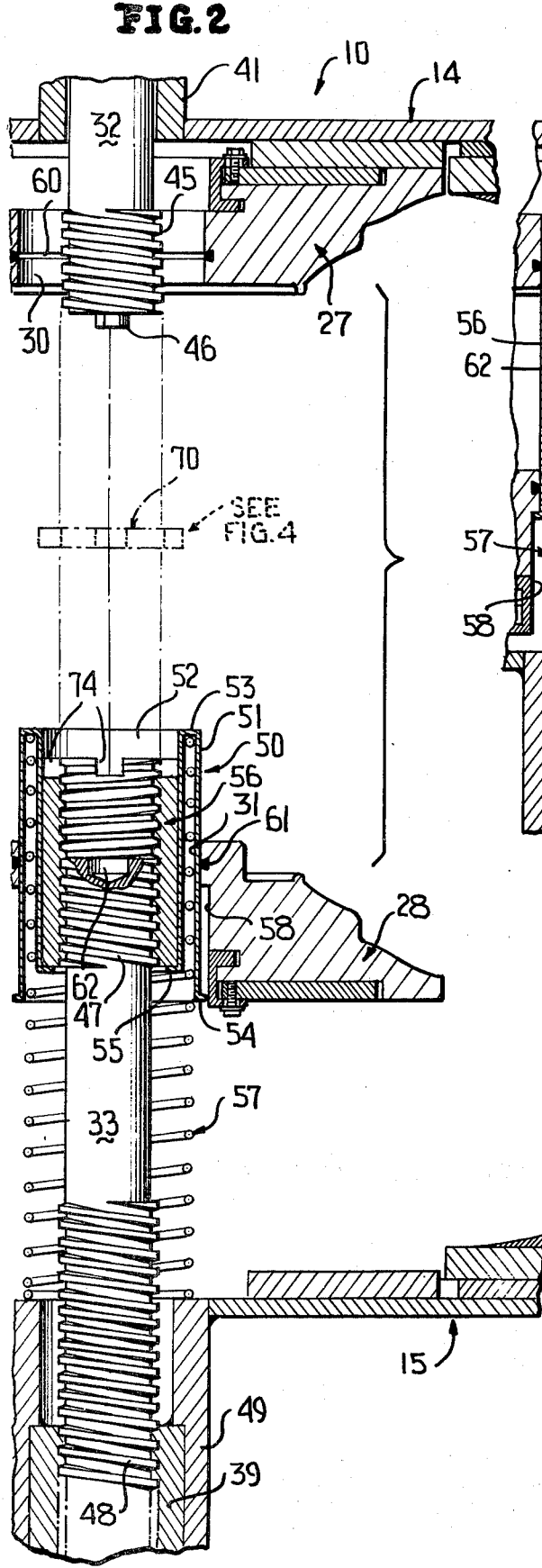
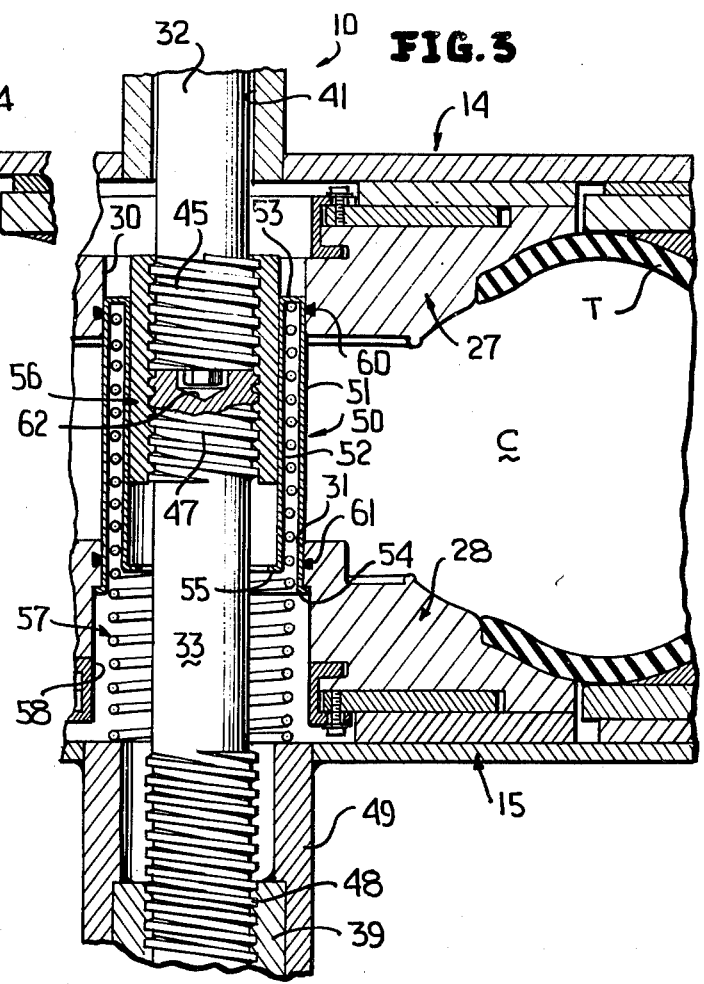
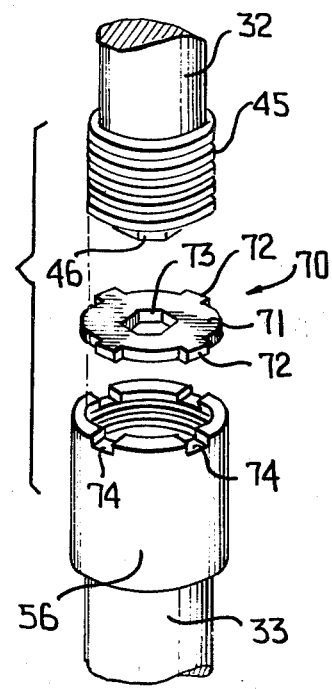

RIMLESS, PRODUCTION MOLD

This invention is directed to a retreading mold which includes first and second relatively movable platens carrying first and second matrices, bead aligner wheels and shafts with the platens being movable between adjacent closed and remote open positions in the former of which the matrices define a chamber adapted to house a tire to be retreaded, the bead aligner wheels having axial aligned openings, a tubular sealing sleeve spanning the chamber in the closed position, and the tubular sleeve having axially aligned opposite end portions received in the associated openings of the bead aligner wheels whereby depending upon the size of the tire being retreaded, the chamber is still sealed by the sealing sleeve.

Still another object of this invention is to provide a novel retreading mold of the type described wherein the sleeve is normally biased away from one bead aligner wheel in a direction toward the other bead aligner wheel and thus "floats" in telescopic relationship to the shafts and bead aligner wheels.

Yet another object of this invention is to provide a novel retreading mold of the type defined wherein the shafts have opposing threaded terminal end portions connected to an internally threaded sleeve or nut, and the latter is connected to a shaft to shift the same axially for changing the distance between platens in the closed position of the molds depending upon the size of the tire to be retreaded in the chamber.

A further object of this invention is to provide a novel retreading mold of the type described wherein the platens are held locked in the closed position of the chamber by the threaded engagement of a first of the shafts with an internally threaded nut carried by a second of the shafts, the second shaft being threaded in a nut carried by the second platen whereby upon rotation of the second shaft the second platen moves axially relative to the first platen to vary the size of the chamber, and the distance of the platens in the closed position is adjusted when the platens are in the open position by adjusting means defining nonrotatable connections between the threaded nut and the first shaft.

Yet another object of this invention is to provide a novel retreading mold of the type last described wherein the adjusting means is a disc having radially outwardly directed projections received in axially opening slots of the threaded nut and a polygonally shaped opening for receiving a polygonally shaped drive member of the first shaft.

With the above and other objects in view that will hereinafter appear, the nature of the invention will be more clearly understood by reference to the following detailed description, the appended claims and the several views illustrated in the accompanying drawings.

IN THE DRAWINGS

FIG. 1 is a view partially in side elevation and axial cross section, and illustrates a retreading mold including first and second relatively movable platens carrying respective first and second matrices, shafts, and bead aligner wheels having axially aligned openings.

FIG. 2 is an enlarged fragmentary axial view of a portion of the retreading mold of FIG. 1, and illustrates an axial sealing sleeve sandwiched in coaxial relationship between one of the bead aligner wheels and a threaded nut carried by one of the shafts, and in phantom outline a mechanism for rotating the lowermost shaft to adjust the lowermost platen to selectively vary the size of a chamber depending upon the tire to be retreaded in the mold.

FIG. 3 is a fragmentary sectional view similar to FIG. 2, and illustrates the mold in its locked position with the shafts coupled to the threaded nut and the tubular sealing sleeve sealing a chamber of the mold.

FIG. 4 is a perspective view of a portion of FIG. 2, and illustrates a flanged disc having a polygonally shaped drive opening for coupling the shafts to each other for axially adjusting the distance between the platens when the latter are in the open position.

DETAILED DESCRIPTION OF THE INVENTION

Figure 1:
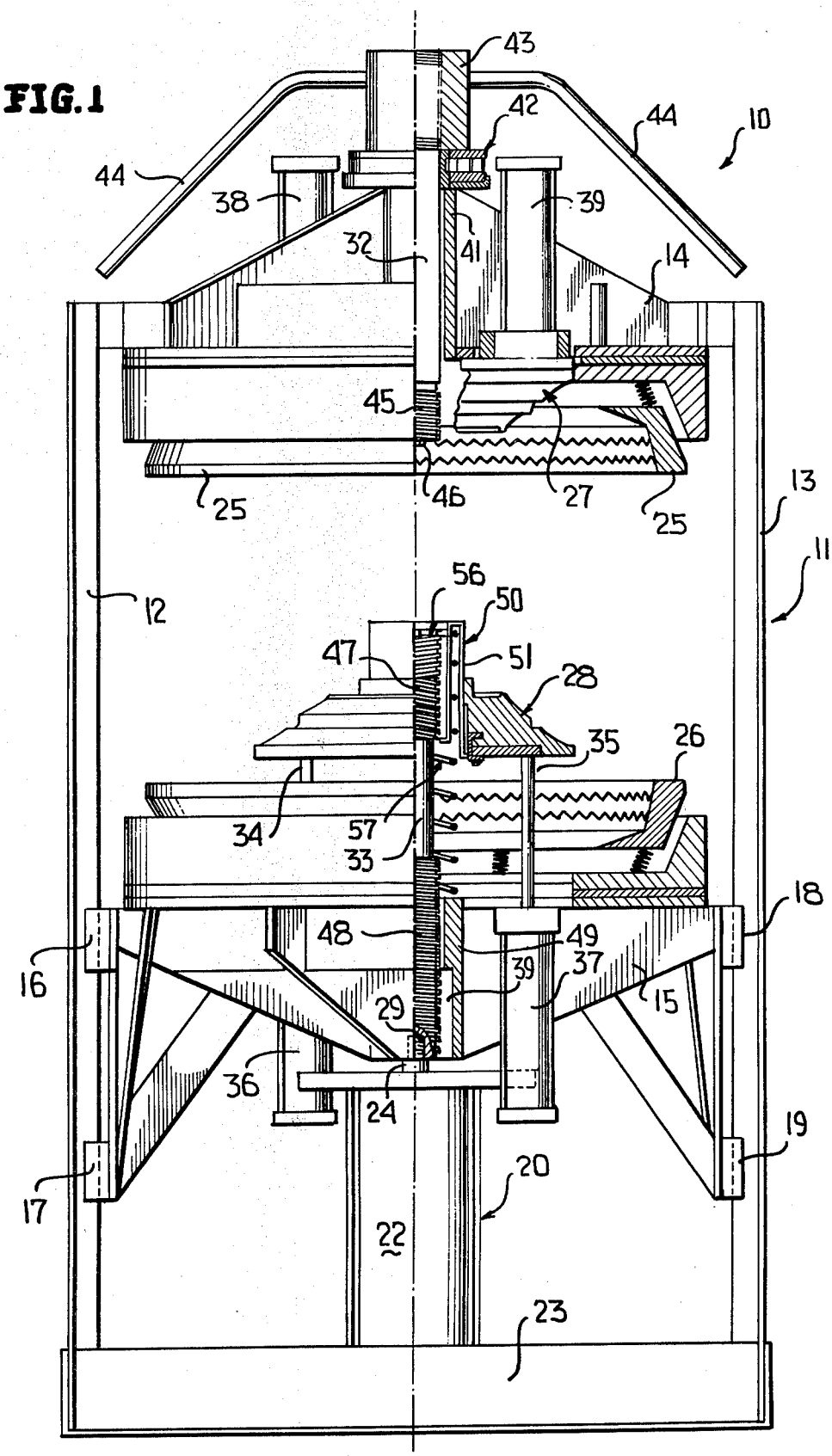

A novel retreading mold constructed in accordance with this invention is fully illustrated in FIG. 1 of the drawings and is generally designated by the reference numeral 10. The retreading mold 10 includes a frame 11 having a pair of generally vertically disposed parallel guide rails 12, 13 to the upper ends of which are fixed a stationary platen 14. A relatively vertically movable platen 15 is provided with suitable guides 16, 17 and 18, 19 which engage the respective rails 12, 13 to guide the movement of the platen 15 upwardly and downwardly relative to the platen 14. The platen 15 is moved vertically by means of a hydraulic motor 20 which includes a cylinder 22 secured to a base 23 of the frame 11 and a piston rod 24 having a piston (not shown) within the cylinder 22. A hydraulic pump (not shown) or the like is suitably connected to the cylinder 22 by conventional means (not shown) to pressurize and/or vent the cylinder 22 to extend and retract the piston rod 24 thereby lifting and/or lowering the platen 15.

The platens 14, 15 carry respective segmented or continuous molds or matrices 25, 26, respectively, and bead aligner wheels 27, 28 having axially aligned openings 30, 31 respectively, and axially aligned shafts 32, 33. The matrices 25, 26 and the bead aligner wheels 27, 28 define in the closed position of the platens 14, 15 (FIG. 3) a chamber C within which is positioned a tire T adapted to be retreaded by the retreading mold 10 in a conventional manner. The bead aligner wheels 27, 28 are selectively moved axially toward and away from each other by means of piston rods connected thereto and received in cylinders carried by the platens 14, 15. Two of such piston rods 34, 35 are shown in FIG. 1 connected to the bead aligner wheel 28 and are received in respective fluid cylinders 36, 37 which are in turn connected to a suitable source (not shown) of hydraulic pressure as in the manner heretofore described relative to the cylinder 22. The bead aligner wheel 27 is similarly connected to piston rods (not shown) received in cylinders 38, 39 carried by the platen 14 and likewise connected to a source (not shown) of hydraulic fluid.

The shaft 32 is received in a sleeve 41 carried by the platen 14 and passes through a thrust roller bearing 42 which is sandwiched between an upper edge (unnumbered) of the sleeve 41 and an enlarged head 43 of the shaft 32 having radially outwardly and downwardly directed handles 44 which are utilized for manually rotating the shaft 32. A terminal end portion 45 (FIGS. 2 and 3) of the shaft 32 is threaded exteriorly thereof and also includes an axial threaded bore (not shown) into which is threaded a bolt having a head 46 which functions in a manner to be described more fully hereinafter.

The shaft 33 also includes an externally threaded terminal end portion 47 and an axially opposite threaded end portion 48 which is threadedly connected to the piston rod 24 (FIG. 1) by a threaded connection 29. The threaded end portion 48 of the shaft 33 is threaded in an internally threaded sleeve 39 which is welded or otherwise secured to a sleeve 49 which is in turn welded or otherwise fixed to the movable platen 15. As is most readily apparent from FIG. 1, by rotating the shaft 33, the platen 15 can be moved upwardly or downwardly due to the threaded connection between the threaded end portion 48 and the threads of the internally threaded sleeve 39. If the shaft 33 is rotated in such a direction as to raise the platen 15 axially upwardly relative to the threaded portion 48, the distance between the platens 14, 15 in the closed position thereof is lessened to allow matrices 25, 26 to be utilized for retreading relatively small tires, whereas if the shaft 33 is rotated in such a direction as to lower the platen 15 axially, the platens 14, 15 in the closed position will be spaced a greater distance from each other thereby allowing larger matrices 25, 26 to be utilized in conjunction with the mold 10 to retread larger tires. The manner in which the adjustment just described is accomplished in keeping with this invention will be described hereinafter.

When the platens 14, 15 are in their closed position, (FIG. 3) it is necessary to seal the chamber C to atmosphere since the interior thereof is pressurized in a conventional manner, and to the latter end means, generally designated by the reference numeral 50, are provided in the form of a generally tubular sleeve for sealing the chamber C in conjunction with the bead aligner wheels 27, 28. The tubular sealing sleeve 50 includes an outer cylindrical wall 51, an inner cylindrical wall 52, an annular end wall 53 bridging the latter walls, and respective outwardly and inwardly directed peripheral flanges 54, 55 carried by lower end portions of the cylindrical walls 51, 52, respectively. The sealing sleeve 50 is in external telescopic relationship to coupling means 56 in the form of an internally threaded nut or sleeve and is in internal telescopic relationship to the openings 30, 31 of the respective bead aligner wheels 27, 28. The sealing sleeve 50 is normally biased in an upward direction, as viewed in FIGS. 2 and 3, by means 57 in the form of a spring bottoming upon an upper face (unnumbered) of the sleeve 52 and upon a lower face (unnumbered) of the annular wall 53. Due to the upward biasing force of the spring 57 upon the sleeve 50, the radially inwardly directed flange 55 abuts against the threaded sleeve 56 (FIG. 2) when the platens 14, 15 are in the open position thereof whereas in the closed position (FIG. 3), the radially outwardly directed flange 54 of the sealing sleeve 50 abuts against an axially opposing annular surface (unnumbered) of a counterbore 58 of the opening 31. Appropriate O-ring seals 60, 61 are received in grooves (unnumbered) of the bead aligner wheels 27, 28, respectively, and are in sealing contact with the outer cylindrical wall 51 of the sealing sleeve 50 to thus seal the chamber C in the closed position of the platens 14, 15 irrespective of the distance therebetween. In FIG. 3 the platens 14, 15 and the associated bead aligner wheels 27, 28 and matrices 25, 26 are illustrated in their furthest relative position from each other.

The platens 14, 15 are held locked in the closed position of FIG. 3 by the threaded engagement of the end portion 45 of the shaft 32 within the threaded nut or sleeve 56 carried by the threaded end portion 47 of the shaft 33. An axial bore 62 is provided in the end portion 47 of the shaft 33 simply to accommodate the head 46 of the bolt (unnumbered) carried by the shaft 32. The threaded nut 56 is also locked to the threaded end portion 47 of the shaft 33 by a radial set screw, pin or the like (not shown). Thus, after the platens 14, 15 have been closed (FIG. 3) the handles 44 connected by the head 43 to the shaft 32 are simply rotated to thread the threaded end portion 45 of the shaft 32 downwardly into the threaded nut 56 to thus lock the platens 14, 15 in their closed position. Thus, as is shown in FIG. 3, the chamber C is sealed by the sealing sleeve 50 and the platens 14, 15 are held in their locked position by the coupled engagement between the threaded end portion 45 of the shaft 32 and the threaded nut 56.

Reference is now made specifically to FIG. 4 of the drawings which illustrates means generally designated by the reference numeral 70 for adjusting the platens 14, 15 relative to each other when the latter are in the open position thereof (FIG. 2). The means 70 is in the form of a disc or plate 71 of a generally annular configuration having radially outwardly directed projections or flange means 72 and a generally axially disposed polygonally shaped opening 73 corresponding in configuration to the head 46 carried by the shaft 32. The radially outwardly directed projections 72 are of a size and shape to fit into axially upwardly opening grooves or notches 74 of the sleeve 56.

In order to adjust the final closed distance between the platens 14, 15, the latter are first moved to their open position (FIGS. 1 and 2), after which the adjusting means 70 is positioned upon the sleeve 56 with the projections 72 received in the slots 74. Thereafter fluid is introduced into the cylinder 22 to raise the piston rod 24 and thus elevate the platen 15 along with the shaft 33 until the head 46 is received in the polygonal opening 73 of the adjusting means 70. Thereafter the handles 44 are grasped and rotated either clockwise or counterclockwise to likewise impart rotation to the shaft 33 through the connection afforded by the elements 46, 73, 72 and 74. The rotation of the shaft 33 is translated to axial upward or downward motion of the platen 15 thereby varying the distance of the platens 14, 15 from each other in the closed position and likewise varying the size of the chamber C to accommodate different sized matrices 25, 26 and obviously different sized tires T which are to be retreaded within the chamber C. Suitable means (not shown) may be provided as in the form of a scale which translates the number of rotations of the handles 44 to the size of matrices 25, 26 which can be accommodated between the platens 14, 15 or this simply can be accomplished through trial and error. The adjusting means 70 is, of course, removed during a retreading operation and is simply utilized during a non-retreading operation to adjust the distances between the platens 14, 15 and thus the size of the chamber C.

Although only a preferred embodiment of the invention has been specifically illustrated and described herein, it is to be understood that minor variations may be made in the method of this invention without departing from the spirit and scope of the invention, as defined in the appended claims.

I claim:

1. A retreading mold comprising first and second relatively movable platens, means for moving said platens between first adjacent closed and second remote open positions, first and second matrices carried by said first and second platens defining in said first position a chamber within which is adapted to be housed a tire to be retreaded, means for locking said platens in said first position, said locking means including a pair of generally coaxial shafts, a first of said shafts being carried by said first platen and a second of said shafts being carried by said second platen, said first and second shafts having respective first and second end portions in generally opposing relationship to each other when said platens are in said first position, means coupling said first and second end portions to each other when said platens are in said first position for locking said platens in said first position, and means positionable between said coupling means and said first shaft when said platens are in said second position for axially adjusting the position of said second platen relative to said second shaft upon rotation of said first shaft whereby said platens can be locked at different distances from each other in said first position.

2. The retreading mold as defined in claim 1 wherein thread means are provided for connecting said coupling means and said second shaft end portion.

3. The retreading mold as defined in claim 1 wherein thread means are provided for connecting said coupling means and said first shaft end portions.

4. The retreading mold as defined in claim 1 wherein thread means are provided for connecting said coupling means and said first shaft end portion, and said adjusting means includes a nonrotatable connection of said coupling means with said second shaft end portion whereby rotation imparted to said adjusting means imparts rotation to said coupling means to move the second platen axially along said second shaft.

5. The retreading mold as defined in claim 1 wherein thread means are provided for connecting said coupling means and said first shaft end portion in said first position, said first shaft end portion being in unthreaded relationship to said coupling means in said second position, and said adjusting means includes a nonrotatable connection with each of said first and second shaft end portions whereby rotation imparted to said first shaft rotates said adjusting means which in turn rotates said coupling means to adjust the second platen axially relative to said second shaft end portion.

6. The retreading mold as defined in claim 1 including first and second bead aligner wheels, carried by said respective first and second platens, said bead aligner wheels having first and second openings in axial relationship to each other and to said first and second shafts, a tubular sealing sleeve disposed in internal telescopic relationship to said bead aligner wheel openings and in external telescopic relationship to said shafts, and said tubular sealing sleeve having axially opposite end portions received in associated ones of said bead aligner wheel openings in said first position.

7. The retreading mold as defined in claim 5 wherein said coupling means is an internally threaded sleeve.

8. The retreading mold as defined in claim 5 wherein one of said nonrotatable connections is radially outboard of another of said nonrotatable connections.

9. The retreading mold as defined in claim 5 wherein said coupling means is an internally threaded sleeve, and said sleeve includes an axially opening slot for receiving a mating projection of said adjusting means and therebetween defining one of said nonrotatable connections.

10. The retreading mold as defined in claim 5 wherein said coupling means is an internally threaded sleeve, said sleeve includes an axially opening slot for receiving a mating projection of said adjusting means and therebetween defining one of said nonrotatable connections, and said first shaft end portion and adjusting means have an interengageable male and female drive connection therebetween defining the other of said nonrotatable connections.

11. The retreading mold as defined in claim 6 including means for normally biasing said sealing sleeve in an axial direction.

12. The retreading mold as defined in claim 6 including means for normally biasing said sealing sleeve in an axial direction, and means for limiting the axial movement of said sealing sleeve in the biasing direction.

13. The retreading mold as defined in claim 6 wherein said sleeve is carried by said coupling means whereby axial movement of said coupling means axially moves said sleeve.

14. The retreading mold as defined in claim 1 including means for threadably connecting said second platen to said second shaft whereby upon rotation being imparted to said first shaft the same is transferred to said second shaft through said axial adjusting means for moving said second platen axially relative to said second shaft.

15. The retreading mold as defined in claim 14 wherein said second shaft is part of said platen moving means.

16. The retreading mold as defined in claim 14 wherein said second shaft is part of said platen moving means, and said second shaft is part of a fluid motor which includes a fluid cylinder and a piston coupled to said second shaft.

17. The retreading mold as defined in claim 16 wherein thread means are provided for connecting said coupling means and said second shaft end portion.

18. The retreading mold as defined in claim 16 wherein thread means are provided for connecting said coupling means and said first shaft end portions.

19. The retreading mold as defined in claim 16 wherein thread means are provided for connecting said coupling means and said first shaft end portion, and said adjusting means includes a nonrotatable connection of said coupling means with said second shaft end portion whereby rotation imparted to said adjusting means imparts rotation to said coupling means to move the second platen axially along said second shaft.

20. The retreading mold as defined in claim 16 wherein thread means are provided for connecting said coupling means and said first shaft end portion in said first position, said first shaft end portion being in unthreaded relationship to said coupling means in said second position, and said adjusting means includes a nonrotatable connection with each of said first and second shaft end portions whereby rotation imparted to said first shaft rotates said adjusting means which in turn rotates said coupling means to adjust the second platen axially relative to said second shaft end portion.

* * * * *